United States Patent
Al-Alusi et al.

(10) Patent No.: US 7,931,740 B2
(45) Date of Patent: Apr. 26, 2011

(54) CYCLONE SEPARATOR

(75) Inventors: Thamir R. Al-Alusi, Mukilteo, WA (US); Anthony D. Drury, Woodinville, WA (US); Eric R. Blume, Seattle, WA (US); Wayne F. Ledzian, Renton, WA (US)

(73) Assignee: The Boeing Company, Chicago, IL (US)

( * ) Notice: Subject to any disclaimer, the term of this patent is extended or adjusted under 35 U.S.C. 154(b) by 352 days.

(21) Appl. No.: 12/143,537

(22) Filed: Jun. 20, 2008

(65) Prior Publication Data

US 2009/0314161 A1 Dec. 24, 2009

(51) Int. Cl.
 *B01D 45/12* (2006.01)
(52) U.S. Cl. .......... 95/271; 55/337; 55/459.1; 55/459.3; 55/356; 55/357; 55/385.3; 55/456; 55/DIG. 34; 95/8; 95/12; 96/417; 96/397
(58) Field of Classification Search .................... 55/337, 55/459.1–459.3, 356, 357, 385.3, DIG. 34, 55/456; 95/271, 8, 12; 96/417, 397
See application file for complete search history.

(56) References Cited

U.S. PATENT DOCUMENTS

| | | | | |
|---|---|---|---|---|
| 2,569,909 A * | 10/1951 | Umney | ............................ | 55/396 |
| 2,698,672 A | 1/1955 | Burnside et al. | | |
| 3,349,548 A * | 10/1967 | Boyen | ............................. | 55/457 |
| 3,399,770 A | 9/1968 | Salomon | | |
| 3,517,821 A * | 6/1970 | Keller et al. | ............... | 210/512.1 |
| 4,414,112 A * | 11/1983 | Simpson et al. | ........... | 210/512.1 |
| 4,806,134 A * | 2/1989 | Lhota | ............................... | 96/114 |
| 4,834,887 A | 5/1989 | Broughton | | |
| 5,248,411 A * | 9/1993 | Chan | .............................. | 208/161 |
| 5,437,794 A | 8/1995 | Andersson | | |
| 5,653,347 A | 8/1997 | Larsson | | |
| 5,746,789 A | 5/1998 | Wright et al. | | |
| 5,762,666 A * | 6/1998 | Amrein et al. | .................. | 55/425 |
| 6,312,594 B1 * | 11/2001 | Conrad et al. | ............. | 210/512.2 |
| 6,485,536 B1 * | 11/2002 | Masters | ........................ | 55/337 |
| 6,572,668 B1 * | 6/2003 | An et al. | ......................... | 55/428 |
| 6,732,406 B2 * | 5/2004 | Oh | .................................. | 15/352 |
| 6,878,189 B2 * | 4/2005 | Moredock | ....................... | 95/270 |
| 2002/0062632 A1 * | 5/2002 | Oh | .................................. | 55/337 |
| 2002/0088347 A1 * | 7/2002 | Kinsel | ............................. | 96/139 |
| 2003/0000186 A1 * | 1/2003 | West | ............................. | 55/459.1 |
| 2005/0115408 A1 * | 6/2005 | Kilgore | ........................... | 95/271 |
| 2005/0150200 A1 * | 7/2005 | Koene et al. | ..................... | 55/456 |
| 2005/0161374 A1 * | 7/2005 | Hakola | .......................... | 209/717 |
| 2007/0095034 A1 * | 5/2007 | Han et al. | ..................... | 55/459.3 |
| 2007/0251386 A1 * | 11/2007 | Swank et al. | .................. | 95/271 |
| 2008/0047239 A1 * | 2/2008 | Zheng et al. | .................... | 55/337 |

(Continued)

OTHER PUBLICATIONS

"Cyclotron Series, The High Efficiency Cyclone Separator," retrieved at <<http://www.filter-1.com/products/cyclone-separator.php>> on Dec. 5, 2007, 2 pgs.

(Continued)

*Primary Examiner* — Jason M Greene
*Assistant Examiner* — Dung Bui
(74) *Attorney, Agent, or Firm* — Lee & Hayes, PLLC

(57) ABSTRACT

Systems and methods for separating contaminants in a contaminated airstream are described. In one embodiment, a contaminated airstream is received and a vortex is created that separates the contaminated airstream into a clean airstream used in the system and contaminants (e.g., debris and particles).

20 Claims, 4 Drawing Sheets

U.S. PATENT DOCUMENTS

| | | | |
|---|---|---|---|
| 2008/0087167 A1* | 4/2008 | Wright et al. | 96/4 |
| 2009/0139192 A1* | 6/2009 | Sams et al. | 55/418 |
| 2009/0151308 A1* | 6/2009 | Jung | 55/337 |
| 2009/0282858 A1* | 11/2009 | Demetri | 62/401 |
| 2009/0308250 A1* | 12/2009 | Rotter et al. | 95/268 |

OTHER PUBLICATIONS

Earle, "Mechanical Separators (cont'd) Sedimentation," retrieved at <<http://www.nzifst.org.nz/unitoperations/mechseparation3.htm>> on Dec. 5, 2007, Unit Operations in Food Processing, Chapter 10, published by NZIFST, 1983, 6 pgs.

* cited by examiner

400

```
┌─────────────────────────────┐
│ RECEIVE CONTAMINATED AIRSTREAM │
│             402             │
└─────────────────────────────┘
              │
              ▼
┌─────────────────────────────┐
│    CREATE VORTEX FROM THE   │
│    CONTAMINATED AIRSTREAM   │
│             404             │
└─────────────────────────────┘
              │
              ▼
┌─────────────────────────────┐
│   SEPARATE FROM THE VORTEX A │
│   CLEAN AIRSTREAM FROM THE  │
│         CONTAMINANTS        │
│             406             │
└─────────────────────────────┘
              │
              ▼
┌─────────────────────────────┐
│   OUTPUT THE CLEAN AIRSTREAM │
│             408             │
└─────────────────────────────┘
              │
              ▼
┌─────────────────────────────┐
│    COLLECT THE CONTAMINANTS │
│             410             │
└─────────────────────────────┘
```

Fig. 4

CYCLONE SEPARATOR

FIELD OF THE INVENTION

The field of the present disclosure is a liquid/debris contaminants separator that divides an incoming airflow mixture (e.g., air, liquid and/or debris) into two streams, a clean air stream for downstream system use, and a contaminants discharge stream.

BACKGROUND OF THE INVENTION

Airplanes, and particularly commercial airplanes, make use Engine Anti-Ice (EAI) systems to melt ice from their engine cowlings. In a typical EAI system, an electro-pneumatic controller controls an EAI valve and position of the EAI valve. The EAI valve in turn controls hot bleed air that is used to heat or melt ice from an engine inlet lip.

A problem with EAI systems is contamination of the electro-pneumatic controller. The electro-pneumatic controller can become contaminated with de-icing fluid and dirt. Typical solutions to this problem include adding an orifice in the EAI ducting system, to drain the liquid and debris out of the EAI system. The existing solution depends on the gravity forces to drain the liquid/debris. The existing solution has very low collection efficiency, and can result in clogged liquid and debris discharge opening of the orifice, which can lead to contaminating the EAI controller components downstream of the orifice, with liquid and debris. After some time, using the existing solution can result in EAI system failure. Such failure may require removal cleaning and reinstallation of several EAI system components, including the drainage system. This is time consuming and can lead to downtime of a commercial airplane resulting in loss in revenue to an airline.

SUMMARY

The cyclone separator in accordance with the teachings of the present disclosure may advantageously provide contaminant separation in an Engine Anti-Ice (EAI) system.

In one embodiment, a contaminant separator receives contaminated air flow, and a spiral plate in the contaminant separator creates a vortex that separates contaminants and clean air. The clean air is released through an outlet to be used in the system.

The features, functions, and advantages that have been above or will be discussed below can be achieved independently in various embodiments, or may be combined in yet other embodiments, further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

FIG. 4 is a flowchart illustrating debris or contaminant separation.

DETAILED DESCRIPTION

The present disclosure teaches systems and methods for a contaminant separator or cyclone collector in an Engine Anti-Ice (EAI) system. Many specific details of certain embodiments of the invention are set forth in the following description and in FIGS. 1-4 to provide a thorough understanding of such embodiments. One skilled in the art will understand that the invention may have additional embodiments, or that the invention may be practiced without several of the details described in the following description. Furthermore, although described in the context of an airplane EAI system, it is to be understood that the systems and disclosures can be applied to other systems, including automobile and pneumatic manufacturing systems.

Figure 1:
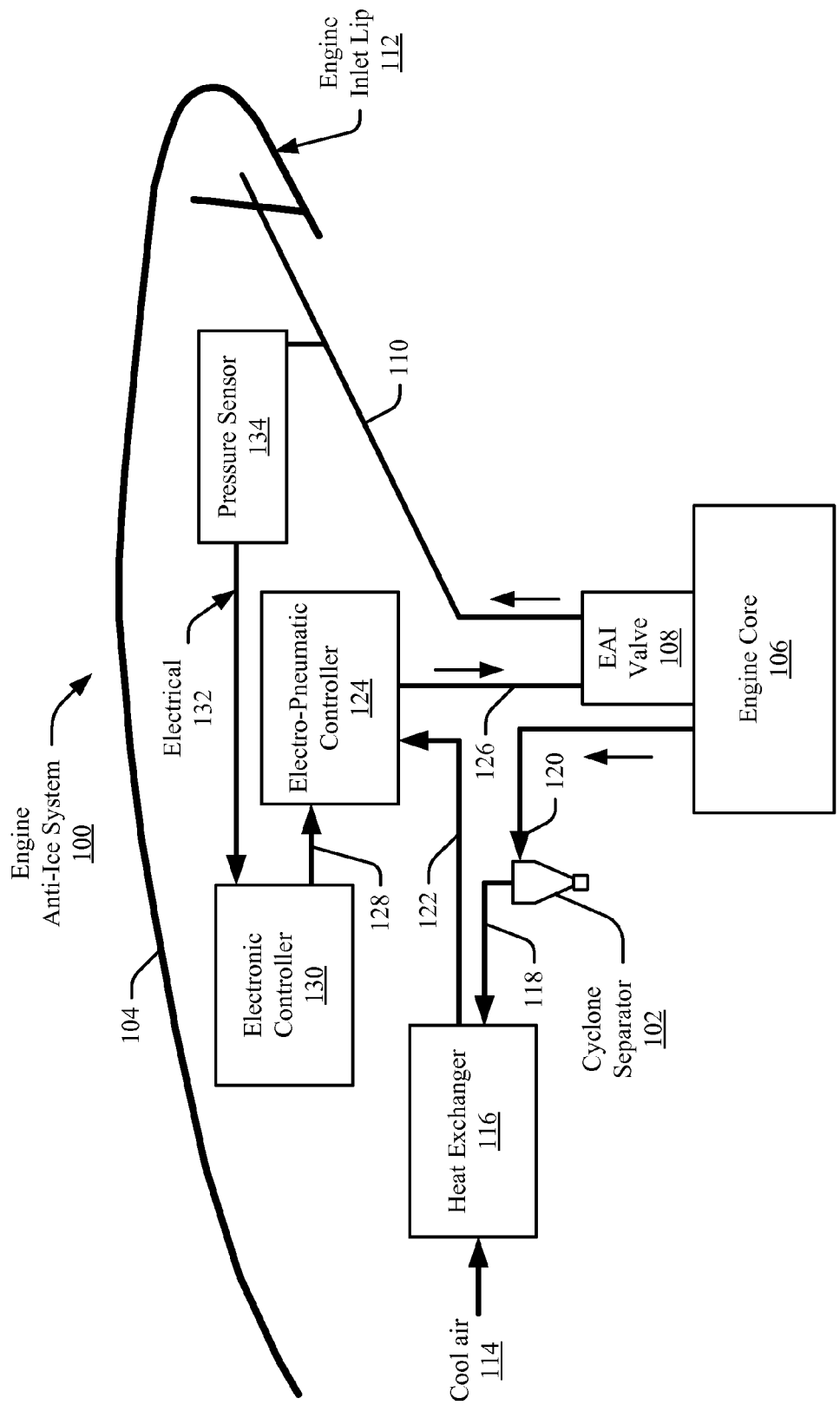
FIG. 1 is a block diagram of an Engine Anti-Ice (EAI) system that includes a cyclone separator.

FIG. 1 illustrates an exemplary Engine Anti-Ice (EAI) system 100 that employs a contaminant separator or cyclone separator 102. The cyclone separator 102, as discussed further below, separates liquid/debris (i.e., contaminants) from a main airstream, utilizing the kinetic energy of the main airstream and generating an airflow pattern inside the cyclone separator 102. The airflow pattern and gravitational forces push contaminants out of the cyclone separator 102. The cyclone separator 102 separates contaminants from a stream of air and liquid, and provides a clean air stream. The clean air stream can provide greater accuracy in the EAI system 100 which depends on accurate feedback in controlling the amount of hot air that is used to de-ice an engine inlet lip 112.

The example EAI system 100 includes an engine cowling 104 and an engine core 106. The engine core 106 provides hot air controlled by an EAI valve 108. Hot bleed air 110 from the EAI valve 108 is used to heat (e.g., de-ice) engine inlet lip 112. Cool air 114 is received by a heat exchanger 116.

The cyclone separator 102 provides clean air 118 to the heat exchanger 116. The heat exchanger provides clean air to an electro-pneumatic controller 124 which provides a stream of air 126 to control the EAI value 108. In effect, the cyclone separator 102 assures that clean air is provided to electro-pneumatic controller 124. As discussed, the EAI valve 108 releases hot bleed air 110, and the EAI valve 108 is controlled by electro-pneumatic controller 124.

In this example the electro-pneumatic controller 124 receives an input 128 from an electronic controller 130. The input 128 may affect a torque motor (not shown) in the electro-pneumatic controller 124. The electronic controller 130 receives an electrical input 132 from a pressure sensor 134 that measure the hot bleed air 110. The described is an exemplary feedback system 100, which may be implemented with various components, which may perform similar functions or different functions as the components that are described. In this example, which can be implemented in other systems, the cyclone separator is used to provide a clean air stream in order to provide accurate feedback in the system 100.

The cyclone separator 102 has a high collection efficiency for separating dry/wet debris mixture from the main stream of the airflow under a wide range of pressure, debris particle sizes, and mass ratio of liquid and debris, to total airflow ratio in the EAI system 100. Continuous discharge of the contaminants or debris, protects the EAI system 100 downstream of the cyclone separator 102, resulting in an increase of system operation reliability and reduction/elimination of frequent system maintenance.

Figure 2:
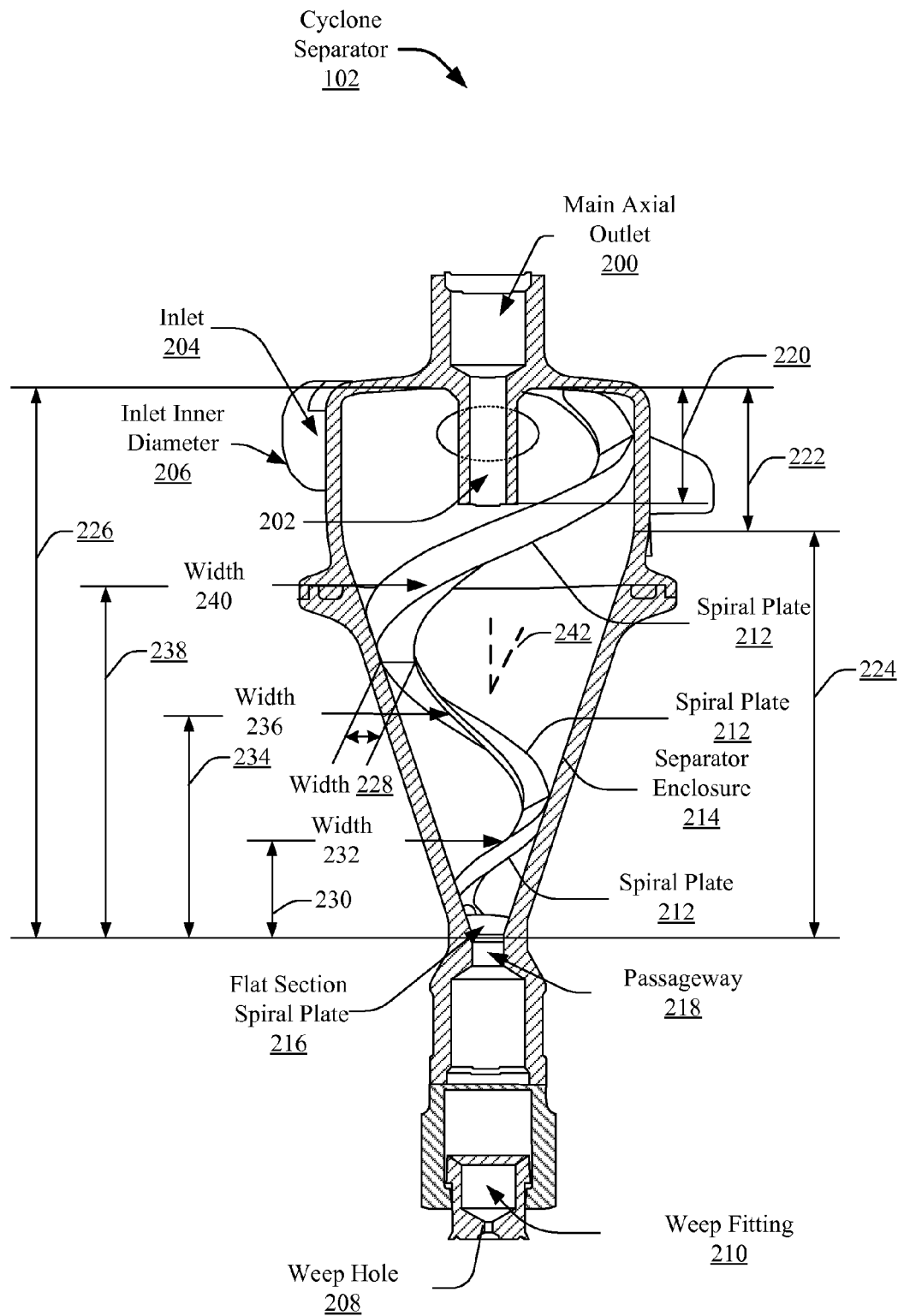
FIG. 2 is a cross section view of a cyclone separator showing exemplary dimensions.

FIG. 2 illustrates a cross sectional view of exemplary cyclone separator 102 showing example dimensions. The cyclone separator 102 includes a main axial outlet 200 from which airflow exits. The main axial outlet 200 may include an inner diameter 202 having an exemplary dimension of 0.250 inches.

A tangential airflow inlet or inlet 204 of the cyclone separator 102 receives contaminated air flow. The inlet 204 promotes rotational flow in the cyclone separator 102. The inlet 204 may have an inner diameter 206 having an exemplary measurement of 0.250 inches. The cyclone separator 102 includes a liquid/debris discharge outlet or weep hole 208 at the bottom of the cyclone separator 102. An example inner diameter of the weep hole 208 may be 0.025 inches. Airflow through the weep hole 208 may be continuous throughout operation of the EAI system 100. A union (not shown) may be provided by the cyclone separator 102, where the union attaches to a weep fitting 210.

The cyclone separator 102 includes a spiral plate 212 that extends through the separator enclosure 214 of the cyclone separator 102. The outer edge of the spiral plate 212 is connected to or part of the separator enclosure 214. The spiral plate 212 includes a flat section 216 which connects to an exit or passageway 218. The flat section 216 assists in increasing the separator efficiency for the collecting particles and debris. The spiral plate 212 is further discussed below.

The separator enclosure 214 includes the inner diameter 202 which can extend as an inner tube, for example by a length 220 of 0.77 inches. The separator enclosure 214 consists of a top cylindrical section and a lower conical section. The cylindrical section of the separator enclosure 214 can have an example height 222 of 1.009 inches. An example dimension for the inner diameter or diameter at this section of the separator enclosure 214 can be 1.970 inches. The separator enclosure 214 can extend, for example, for a length 224 of 2.671 inches, for a total length or height 226 of 3.680 inches.

The width 228 of the spiral plate 212 can vary depending on a particular height along the enclosure or separator enclosure 214 of the cyclone separator 102. For example, at height 230 which may have a value of 0.6875 inches, the width 232 can be 0.1361 inches; at height 234 which may have a value of 1.375 inches, the width 236 can be 0.1995 inches; and at height 238 which may have a value of 2.275 inches, the width 240 can be 0.2752 inches. It is to be understood, that the values given are exemplary, and are used to illustrate the invention. Appropriate dimensions for the cyclone collector 102 are determined to maximize collection efficiency. In particular, the appropriate dimensions can be determined as to the spiral plate 212, the length 220 or extension of the cyclone outlet duct into the container, and diameter of the weep hole 208. In determining such dimensions, and designing a specific cyclone separator, computational fluid dynamics (CFD) analysis may be implemented.

The width of the spiral plate 212 and the horizontal flat section 216 at the bottom end of the spiral plate 212 with inner tube length at the outlet 200 provide efficient debris collection. The spiral plate 212 plate helps in trapping the liquid/debris. The spiral plate 212 begins, facing the inlet 204 port, at the top surface of the separator enclosure 214 and extends to the weep hole 208. The start of the spiral plate 212 relative to the inlet 204 is a factor as to efficiency of the cyclone separator. For example, the total height of the spiral plate 212 may be 3.64 inches. The spiral plate 212 makes 2.6 complete turns from the top of the separator enclosure 214 to the bottom at the weep hole fitting 210. The spiral plate 212 may vary in width form the start at the inlet 204 at approximately 0.193 inches wide and linearly expands in width to approximately 0.290 inches after 1.3 turns, then decreases width back down to about 0.10 inches at the weep hole 208 egress. At the egress point of the spiral the spiral plate 212 turns horizontal to form the flat section 216.

The flat section 216 allows the accommodation of a smaller diameter weep hole 208, at the end of the spiral plate 212. The flat section 216 with the internal pressure force the debris/contaminants through a weep hole 208 that is smaller than one, if the flat section 216 were not provided. In other words, without the flat section 216, a larger weep hole 208 may be needed; however, increasing the diameter of the weep hole 208 may result in higher leakage air through the weep hole 208 and results in degrading pneumatic efficiency of the Anti-Ice System 100.

The cyclone separator 102 may be designed such that separator enclosure 213 has an angle of 18.25 degrees (15 to 20 degrees) from the vertical tangent to the cylindrical section of the cyclone separator 102, as represented by the dotted line 242. This allows greater cyclone separator 102 collection efficiency.

The cyclone separator 102 may further include a horizontal split to allow easier cleaning. A standard high pressure "V-band" may be used to keep the cyclone separator 102 together during operation.

Figure 3:
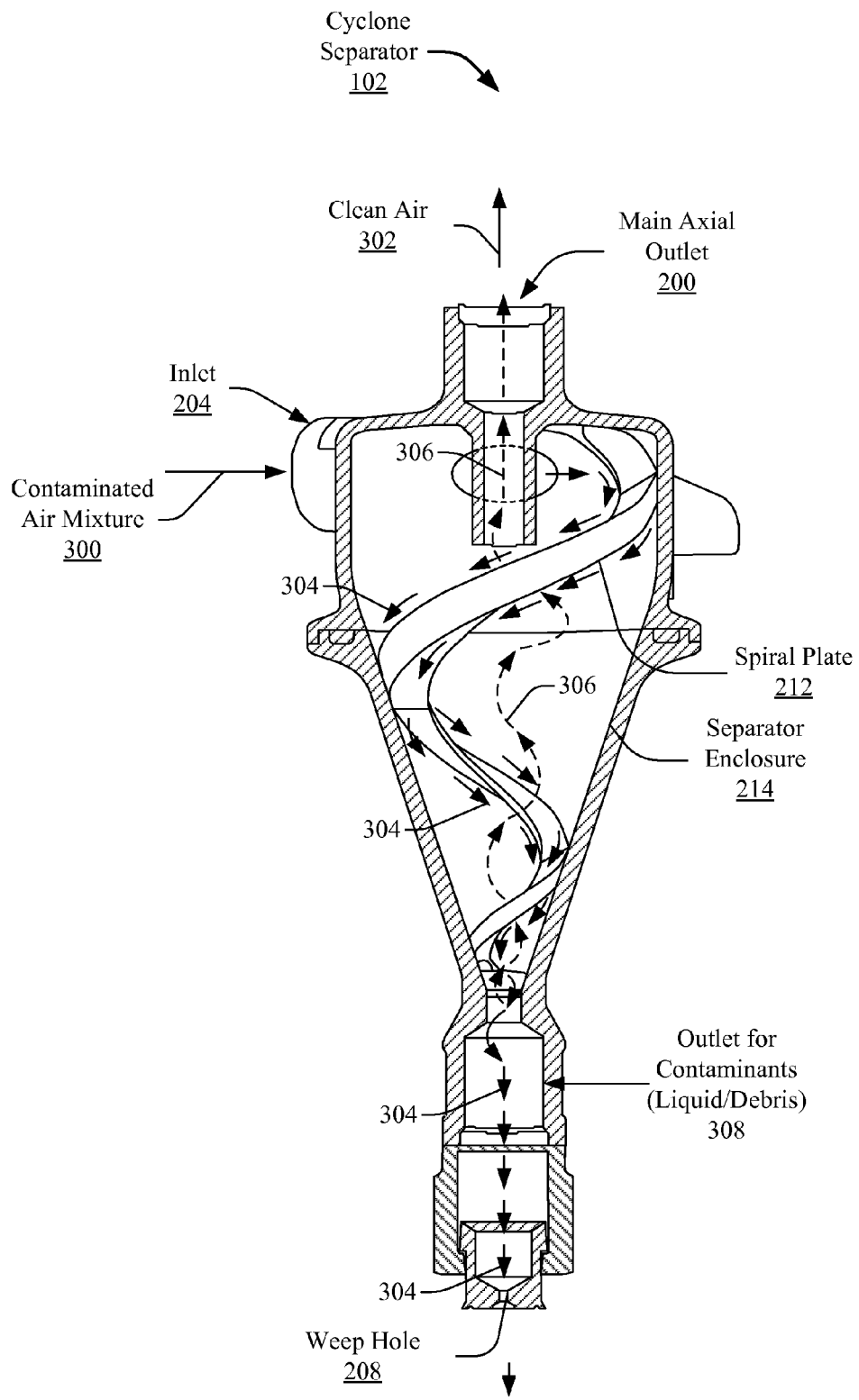
FIG. 3 is a cross section view of a cyclone separator showing air flow and debris/contaminant flow.

FIG. 3 illustrates a cross sectional view of exemplary cyclone separator 102 showing airflow. A high airflow with the liquid and/or debris or contaminated air mixture 300 tangentially enters the cyclone separator 102 through inlet 204. An exterior vortex is created, moving downward along the wall of separator enclosure 214 section of the cyclone separator 102. Centrifugal forces of liquid particles and/or debris 304 move the particles and/or debris 304 outboard toward the wall of the separator enclosure 214. As the exterior vortex moves down into the separator enclosure 214, the vortex diameter decreases to a critical diameter where the airflow reverses its direction to an upward airflow 306 at the center of the cyclone separator 102 toward the main axial outlet 200. In addition to the downward movement of the exterior vortex, the spiral plate 212 traps the compacted particles of liquid and/or debris which are guided toward outlet 308 and the weep hole 208. The spiral plate 212 further accommodates a relatively smaller weep hole 208 diameter, compared to a collector without spiral plate 212. The use of a smaller weep hole 208 diameter reduces the flow rate of the leakage air which may be required to discharge the liquid/debris particles 304 through the weep hole or outlet 208, which in turn increases the operating efficiency of the EAI system 100. In addition, the spiral plate 212 increases the collection efficiency of the cyclone separator 102.

Exemplary Method

Exemplary systems and separators for separating contaminants are described with reference to FIGS. 1-3. FIG. 4 illustrates an exemplary method 400 for separation of particles/debris (contaminants) from an airstream in a system. The order in which the method is described is not intended to be construed as a limitation, and any number of the described method blocks can be combined in any order to implement the method.

At block 402, a contaminated airstream is received. The contaminated airstream can include various particles or debris, including liquid. For example, in the EAI system 100, the contaminants can include de-icing liquid. The contaminated airstream may be removed from the control system as described above in reference to EAI system 100. The cyclone separator 102 operates under a wide range of the contaminated air stream pressure. For example the contaminated air stream operating pressure could be between 50 psi to 400 psi.

At block 404, a vortex is created of the contaminated airstream. The vortex that is generated creates a downward flow and an upward flow. As discussed above, such a vortex may be created using a spiral plate and a tapering cone of the cyclone separator.

At block 406, the contaminants and a clean airstream are separated from the vortex. The contaminants may be pushed down in the downward flow of the vortex and the clean air may be sent out through the upward flow of the vortex at the center of the separator enclosure 214.

At block 408, the clean airstream is output or released. This clean airstream may be used in feedback or control downstream of the system as discussed above in reference to the EAI system 100.

At block 410, contaminants may be collected. This collecting may be performed through a separate opening, such as a weep hole 208 discussed above. The weep hole 208 may also be connected to a collecting device or fitting.

CONCLUSION

While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

What is claimed is:

1. A contaminant separator comprising:
   a separator enclosure;
   an airflow inlet tangential to the separator enclosure that receives contaminated air flow;
   a spiral plate having a sloped section and a horizontal flat section in the separator enclosure that creates a vortex of the contaminated air flow, and separates contaminants from clean air; and
   an outlet that egresses clean air flow.

2. The contaminant separator of claim 1, wherein the separator enclosure includes an extended inner tube from the outlet.

3. The contaminant separator of claim 1, wherein the separator enclosure has an angle of between 15 to 20 degrees vertical tangent to a cylindrical section of the contaminant separator.

4. The contaminant separator of claim 1, wherein the flat section provides internal pressure in the contaminant separator, that force the contaminants through a weep hole.

5. The contaminant separator of claim 1, wherein the spiral plate has varying widths along the separator enclosure.

6. The contaminant separator of claim 1, wherein the contaminated airflow and clean air have an operating pressures of 50 to 400 psi.

7. The contaminant separator of claim 1 further comprising a liquid and debris discharge outlet for separated contaminants.

8. The contaminant separator of claim 1 further comprising a union that attaches to a weep fitting, for cleaning.

9. A system comprising:
   a cyclone separator that separates liquid or debris from a main airstream and generates a clean air stream by creating a vortex in the cyclone separator, the cyclone separator includes:
      a separator enclosure that comprises a cylindrical upper housing section and a conical lower housing section;
      a tangential inlet on the cylindrical upper housing section that channels the main air stream to the separator enclosure;
      a weep hole that egresses the liquid or the debris, and
      a spiral plate enclosed in the separator enclosure that creates the vortex, the spiral plate including a sloped section and a horizontal flat section;
   an electro-pneumatic controller the receives the clean air stream; and
   a valve that is controlled by the electro-pneumatic controller, that releases air to an engine.

10. The system of claim 9, wherein the cyclone separator continuously discharges the liquid or debris.

11. The system of claim 9, wherein the main airstream varies in range as to pressure, debris particle sizes, and mass ratio of liquid and debris.

12. The system of claim 9, wherein the electro-pneumatic controller is controlled by an electronic controller as part of a feedback control of the system.

13. The system of claim 9, wherein the air released by the valve is hot bleed air.

14. The system of claim 9, wherein the system is an Engine Anti-Ice system.

15. The system of claim 9, wherein the cylindrical upper housing section and the conical lower housing section are joined together by a high pressure v-band.

16. The system of claim 9, wherein the spiral plate at least partially follows an inner surface of the conical lower housing section as the spiral plate leads from the tangential inlet to the weep hole.

17. A method of separating contaminants comprising:
   receiving a contaminated airstream through a tangential inlet;
   creating a vortex from the contaminated airstream using a spiral plate having a sloped section and a horizontal flat section, wherein the vortex creates a downward flow and an upward flow;
   separating a clean airstream from contaminants in the vortex, wherein the clean airstream is in the upward flow; and
   outputting the clean airstream.

18. The method of claim 17, wherein the receiving is part of a control feedback system.

19. The method of claim 17, wherein the separating comprises outputting the contaminants downward in the vortex.

20. The method of claim 17 further comprising collecting the contaminants.

* * * * *